United States Patent
Hill et al.

(10) Patent No.: US 12,244,184 B2
(45) Date of Patent: Mar. 4, 2025

(54) SYSTEMS AND METHODS FOR INTENTIONALLY BREAKING SHAFTS OF COMPROMISED ELECTRIC MACHINES WITH ELECTRO-THERMAL ACTIVATION

(71) Applicant: Rolls-Royce Corporation, Indianapolis, IN (US)

(72) Inventors: Mathew Hill, Southfield, MI (US); David R. Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 345 days.

(21) Appl. No.: 17/960,768

(22) Filed: Oct. 5, 2022

(65) Prior Publication Data

US 2024/0120811 A1    Apr. 11, 2024

(51) Int. Cl.
*H02K 11/25*      (2016.01)
*B64D 27/24*      (2024.01)
(Continued)

(52) U.S. Cl.
CPC .............. *H02K 11/25* (2016.01); *B64D 27/24* (2013.01); *B64D 35/00* (2013.01); *H02K 1/12* (2013.01);
(Continued)

(58) Field of Classification Search
CPC ............ H02P 2101/30; H02P 2207/05; H02P 2207/055; H02P 2207/076; H02P 21/22; H02P 23/07; H02P 27/06; H02P 25/064; H02P 25/062; H02P 29/60; H02P 29/64; H02P 29/662; H02P 3/12; H02P 3/22; H02P 29/028; H02P 29/032; H02K 11/25; H02K 1/12; H02K 1/27; H02K 7/003; H02K 11/33; H02K 1/17; H02K 21/14; H02K 3/527; H02K 15/03; H02K 11/27; H02K 21/046; H02K 2213/06; H02K 23/04; H02K 7/116; H02K 9/06; B64D 27/24; B64D 35/00; B64D 2221/00; B64D 27/33; F01B 1/10; F02B 77/11; F02B 75/002; Y02T 50/80; Y02T 50/00; H02H 7/0833
See application file for complete search history.

(56) References Cited

U.S. PATENT DOCUMENTS 7,173,399 B2  2/2007  Sihler et al.
8,907,512 B2  12/2014  Kuczaj
(Continued)

FOREIGN PATENT DOCUMENTS

DE  102016220234 A1 * 4/2018  ............. B64D 27/24
FR     1061450 A      4/1954
WO  2018215205 A1   11/2018

OTHER PUBLICATIONS

"Bachmaier Georg et al., Disconnecting Device For Troubleshooting An Electrical Machine, Apr. 19, 2018, Clarivate Analytics, pp. 1-20" (Year: 2018).*

(Continued)

*Primary Examiner* — Antony M Paul
(74) *Attorney, Agent, or Firm* — Barnes & Thornburg LLP (57) ABSTRACT

An aircraft includes an engine and an electric power system. The electric power system includes a permanent magnet machine. The permanent magnet machine includes a stator and a rotor configured to rotate relative to the stator.

20 Claims, 8 Drawing Sheets

(51) Int. Cl.
*B64D 35/00* (2006.01)
*H02K 1/12* (2006.01)
*H02K 1/27* (2022.01)
*H02K 7/00* (2006.01)
*H02K 11/33* (2016.01)

(52) U.S. Cl.
CPC ............... *H02K 1/27* (2013.01); *H02K 7/003* (2013.01); *H02K 11/33* (2016.01); *B64D 2221/00* (2013.01)

(56) References Cited

U.S. PATENT DOCUMENTS

| | | |
|---|---|---|
| 9,729,096 B2 | 8/2017 | Edwards |
| 10,125,692 B2 | 11/2018 | Ernst |
| 10,837,304 B2 | 11/2020 | Vondrell et al. |
| 10,951,095 B2 | 3/2021 | Miller et al. |
| 11,085,377 B2 | 8/2021 | Rodrigues |
| 11,236,678 B2 | 2/2022 | Davies |
| 2012/0201657 A1 | 8/2012 | Donnelly et al. |
| 2017/0219019 A1 | 8/2017 | Wirsch, Jr. et al. |

OTHER PUBLICATIONS

Yi-Le Xu et al., Mechanical and thermal properties of a room temperature curing epoxy resin and related hemp fibers reinforced composites using a novel in-situ generated curing agent, Materials Chemistry and Physics, vol. 203, 2018, pp. 293-301.

Extended European Search Report for Application No. 23196297.8-1202, dated Feb. 23, 2024, 4 pages.

\* cited by examiner

SYSTEMS AND METHODS FOR INTENTIONALLY BREAKING SHAFTS OF COMPROMISED ELECTRIC MACHINES WITH ELECTRO-THERMAL ACTIVATION

FIELD OF THE DISCLOSURE

The present disclosure relates generally to aircrafts, and more specifically to aircrafts with permanent magnet machines.

BACKGROUND

Interest in onboard electrical energy generation in vehicles continues to be a trend, as other onboard systems use increasingly more electrical energy during operation. In some aircraft and other weight-sensitive applications, permanent magnet generators are integrated for various reasons of efficiency and/or power needs.

Permanent magnets included in permanent magnet generators typically cannot be switched off in under normal circumstances, and will continue to create a moving magnetic field so long as the machine is rotating. This rotation continues even if there is a short circuit in the stator windings, which can threaten the system with overheating. Some solutions to this potential problem include heavy brakes or clutches to manage rotation in the event of such a short circuit. There is a need for further refined and lightweight solutions to manage rotation of permanent magnet generator rotors in the event of a short circuit or other fault in the system.

SUMMARY

The present disclosure may comprise one or more of the following features and combinations thereof.

An aircraft may include an engine, an electric power system, a shaft, and a control system. The electric power system may include a permanent magnet machine and an electric control unit coupled to the permanent magnet machine. The permanent magnet machine may include a stator having a plurality of coils and a rotor having a plurality of permanent magnets. The rotor may be configured to rotate relative to the stator to move the plurality of permanent magnets relative to the plurality of coils of the stator. The shaft may be coupled to the rotor of the permanent magnet machine to transfer rotation from the engine to the permanent magnet machine to drive rotation of the rotor.

In some embodiments, the shaft may include a first shaft end segment coupled with the engine, a second shaft end segment coupled with the permanent magnet machine, a shaft body that extends between and interconnects the first shaft end segment, and a fuse imbedded in the shaft body. The first and second shaft end segments may comprise electrically conductive metallic material. The shaft body may comprise electrically non-conductive material. In some embodiments, the non-conductive material may be a thermoset plastic. The fuse may be configured to generate heat when an electric current is passed through the fuse.

In some embodiments, the control system may include a controller coupled to the electric control unit of the electric power system. The controller may be configured to direct the electric control unit of the electric power system to introduce the electric current through the fuse. The electric control unit may introduce the electric current through the fuse to cause the fuse to heat the shaft body above a transition temperature of the electrically non-conductive material of the shaft body. The shaft body is heated above the transition temperature to selectively cause failure of the shaft in response to the controller receiving a signal indicative of a fault in the permanent magnet machine. In this way, the rotor of the permanent magnet machine is mechanically decoupled from the engine thereby avoiding generation of undesired electrical energy and/or heat.

In some embodiments, the electric control unit of the electric power system may include a converter and an inverter. The converter may be coupled to the permanent magnet machine. The inverter may be coupled to the permanent magnet machine.

In some embodiments, the shaft body of the shaft may have a buckling mode shape. The fuse may be positioned along the buckling mode shape of the shaft. In some embodiments, the fuse may extend axially in a straight line parallel with an axis of the shaft body.

In some embodiments, the shaft may further include a shaft containment sleeve. The shaft containment sleeve may be arranged around the shaft.

In some embodiments, the aircraft may further comprise a gearbox. The gearbox may be coupled to the engine and the first shaft end segment of the shaft.

In some embodiments, the fault in the permanent magnet machine may include at least one of a turn-to-turn fault, a phase-to-phase fault, and a phase-to-ground fault. The fault in the permanent magnet machine may include a turn-to-turn fault. The fault in the permanent magnet machine may include a phase-to-phase fault. The fault in the permanent magnet machine may include a phase-to-ground fault.

In some embodiments, the controller may be configured to direct the converter to introduce the electric current into the shaft by unbalancing residual currents in the shaft. The controller may be configured to direct the converter to introduce the electric current into the shaft by unbalancing residual currents in the shaft in response to receiving the signal indicative of the fault in the permanent magnet machine.

In some embodiments, the control system may further include ground brushes. The ground brushes may be coupled to the converter. The ground brushes may be configured to engage the shaft body of the shaft.

In some embodiments, the controller may be configured to direct the converter to introduce the electric current into the shaft through the ground brushes. The controller may be configured to direct the converter to introduce the electric current into the shaft through the ground brushes in response to receiving the signal indicative of the fault in the permanent magnet machine.

In some embodiments, the control system may further include at least one static electrode. The static electrode may be coupled to the inverter and located adjacent to the shaft body.

In some embodiments, the controller may be configured to direct the inverter to introduce the electric current into the shaft by applying a voltage to the at least one static electrode. The controller may be configured to direct the inverter to introduce the electric current into the shaft by applying a voltage to the at least one static electrode in response to receiving the signal indicative of the fault in the permanent magnet machine.

In some embodiments, the controller may be configured to receive a signal indicative of failure of the shaft after the electric control unit of the electric power system introduces the electric current into the shaft. The controller may be configured to receive a signal indicative of failure of the shaft after the electric control unit introduces the electric current into the shaft to confirm the shaft has failed in response to the heat generated by the fuse.

According to another aspect of the present disclosure, an aircraft may include an engine, an electric power system, a shaft, and a control system. The electric power system may include a permanent magnet machine that includes a stator having a plurality of coils and a rotor having a plurality of permanent magnets. The rotor may be configured to rotate relative to the stator to move the plurality of permanent magnets relative to the plurality of coils in the stator. The shaft may be coupled to the rotor of the permanent magnet machine to transfer rotation from the engine to the permanent magnet machine to drive rotation of the rotor.

In some embodiments, the shaft may include a shaft body and a fuse. The shaft body may comprise an electrically non-conductive material. The fuse may be coupled with the shaft body and in selective electric communication with the electric power system. The fuse may be configured to generate heat when an electric current is introduced into the fuse. In some embodiments, the non-conductive material may be a thermoset plastic.

In some embodiments, the control system may include a controller. The controller may be coupled to the electric power system. The controller may be configured to direct selectively the electric power system to introduce the electric current into the fuse to cause the fuse to heat the shaft body above a transition temperature of the electrically non-conductive material of the shaft body to cause the shaft to fail.

In some embodiments, the shaft body of the shaft may have a buckling mode shape. The fuse may be positioned along the buckling mode shape of the shaft.

In some embodiments, the shaft may further include a shaft containment sleeve. The shaft containment sleeve may be arranged around the shaft.

In some embodiments, the aircraft may further comprise a gearbox. The gearbox may be coupled to the engine and the first shaft end segment of the shaft.

In some embodiments, a fault in the permanent magnet machine may include at least one of a turn-to-turn fault, a phase-to-phase fault, and a phase-to-ground fault. The fault in the permanent magnet machine may include a turn-to-turn fault. The fault in the permanent magnet machine may include a phase-to-phase fault. The fault in the permanent magnet machine may include a phase-to-ground fault.

In some embodiments, the controller may be configured to direct the electric power system to introduce the electric current into the shaft by unbalancing residual currents in the shaft. The controller may be configured to direct the electric power system to introduce the electric current into the shaft by unbalancing residual currents in the shaft in response to receiving a signal indicative of the fault in the permanent magnet machine.

In some embodiments, the control system may further include ground brushes. The ground brushes may be coupled to the electric power system. The ground brushes may be configured to engage the shaft body of the shaft.

In some embodiments, the controller may be configured to direct a converter to introduce the electric current into the shaft through the ground brushes. The controller may be configured to direct a converter to introduce the electric current into the shaft through the ground brushes in response to receiving a signal indicative of the fault in the permanent magnet machine.

In some embodiments, the control system may further include at least one static electrode. The static electrode may be coupled to the electric power system and located adjacent to the shaft body.

In some embodiments, the controller may be configured to direct the electric power system to introduce the electric current into the shaft by applying a voltage to the at least one static electrode. The controller may be configured to direct the electric power system to introduce the electric current into the shaft by applying a voltage to the at least one static electrode in response to receiving a signal indicative of the fault in the permanent magnet machine.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
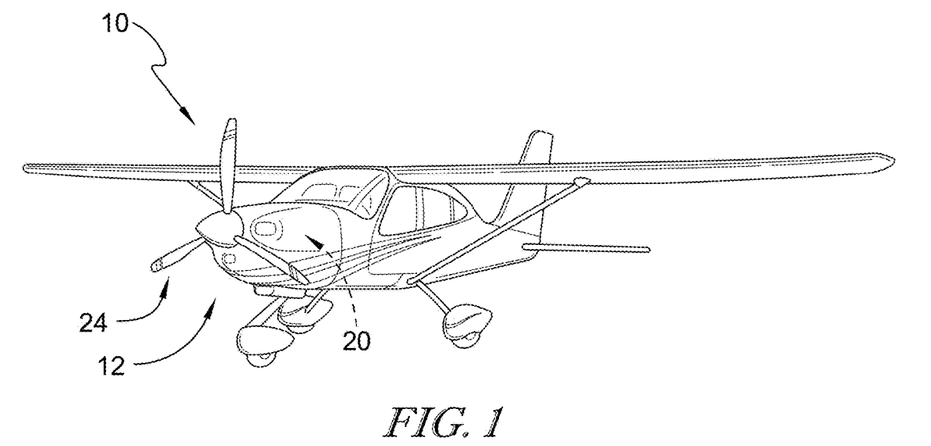
FIG. 1 is a perspective view of a hybrid aircraft including a propeller adapted to be driven by an internal combustion engine and/or by an electric power system with an electric motor-generator as suggested in the diagrammatic view of the aircraft drivetrain shown in FIG. 2.
Figure 2:
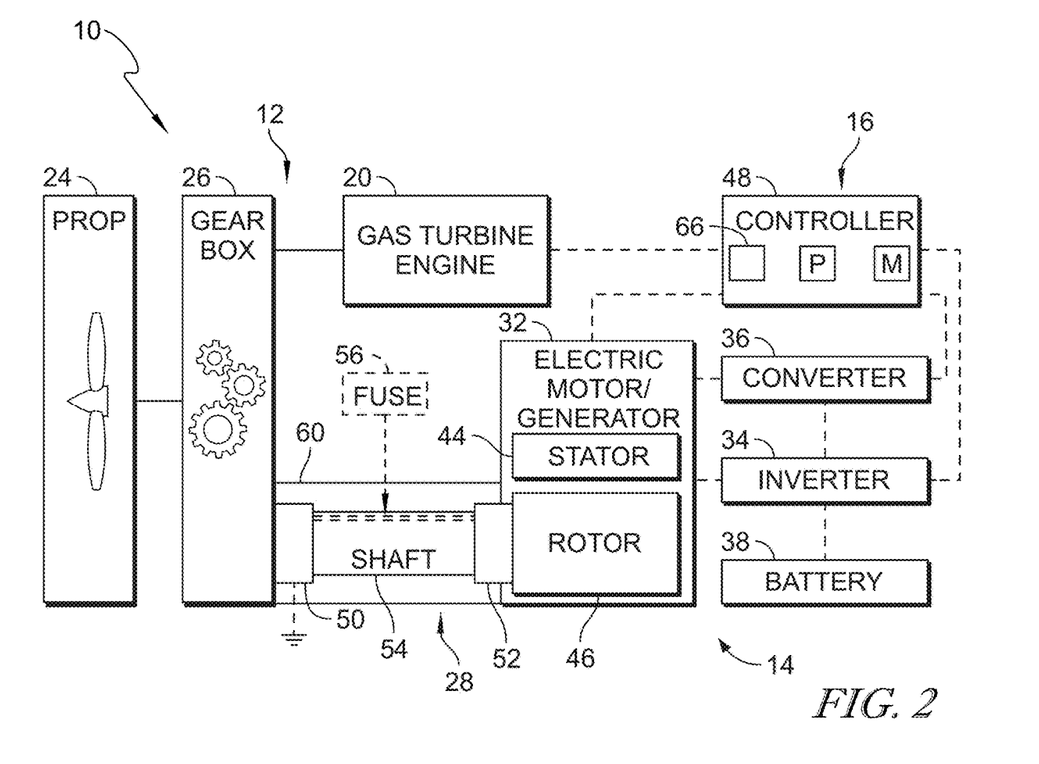
FIG. 2 is a diagrammatic view of the drivetrain of the hybrid aircraft in FIG. 1 showing that the drivetrain includes an output assembly, made up of the propeller and a gearbox; a gas turbine engine; the electric power system, made up of the electric motor-generator along with an inverter, a converter, and battery; a shaft coupled to the electric motor-generator to carry rotation from the gas turbine engine to the electric motor-generator, the shaft having an imbedded fuse configured to generate heat when an electric current is introduced into the shaft; and a controller configured to selectively activate the fuse to heat the shaft body and cause shaft failure in response to indications of a fault in the electric motor-generator so that undesired power and/or excess heat is avoided.

A first embodiment of an electrified aircraft 10, like a hybrid aircraft, is shown in FIGS. 1 and 2. The hybrid aircraft 10 includes a drivetrain 12 and an electric power system 14 as shown in FIGS. 1-6. The drivetrain 12 includes, among other components, a gearbox 26 and a shaft 28 that couples the gearbox 26 with a permanent magnet machine 32 included in the electric power system 14. The shaft 28 includes a fuse 56 that may be activated, selectively, to cause the shaft 28 to fail and decouple the permanent magnet machine 32 from the gearbox 26. In this way, undesired electrical power and/or heat generation may be avoided during fault events such as a short circuit in the electric power system 14.

Figures 13, 14:
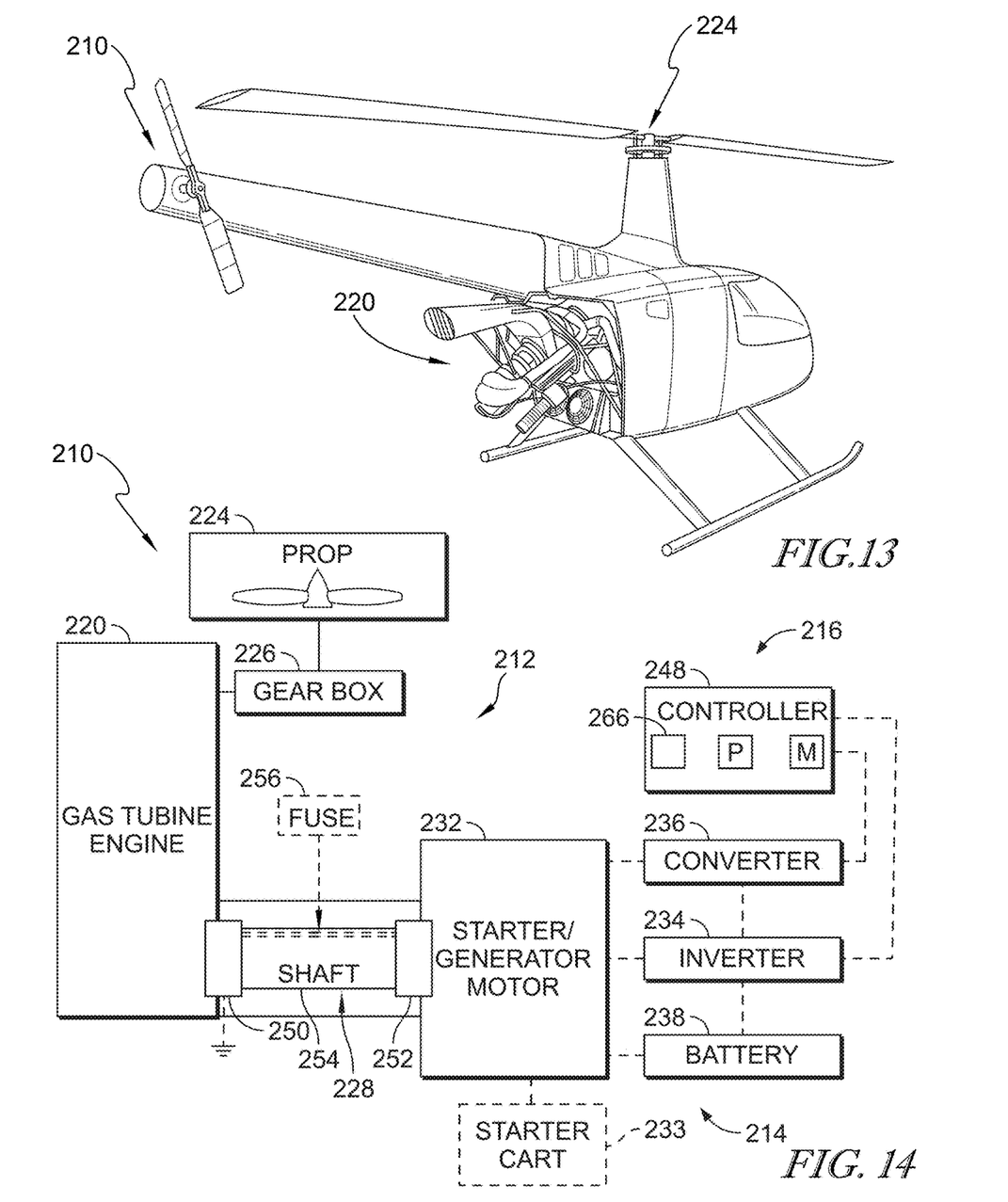
FIG. 13 is a perspective view of an aircraft including a propeller adapted to be driven by an engine with a starter-generator motor as suggested in the diagrammatic view of the drivetrain in FIG. 14.
FIG. 14 is a diagrammatic view of the drivetrain of the aircraft in FIG. 13 showing that the drivetrain includes a shaft coupled to the electric motor-generator to carry rotation from the gas turbine engine to the starter-generator motor, the shaft including an imbedded fuse configured to generate heat when an electric current is introduced into the shaft to selectively cause shaft failure.
Figure 15:
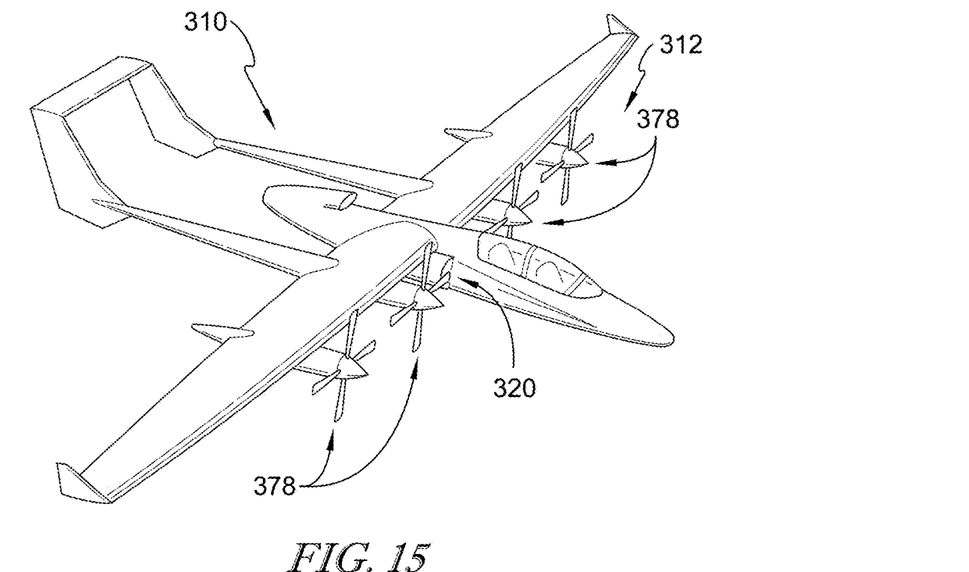
FIG. 15 is a perspective view of an electrified drivetrain having a gas turbine engine for power generation via onboard generators as suggested in the diagrammatic view of the drivetrain in FIG. 16.
Figure 16:
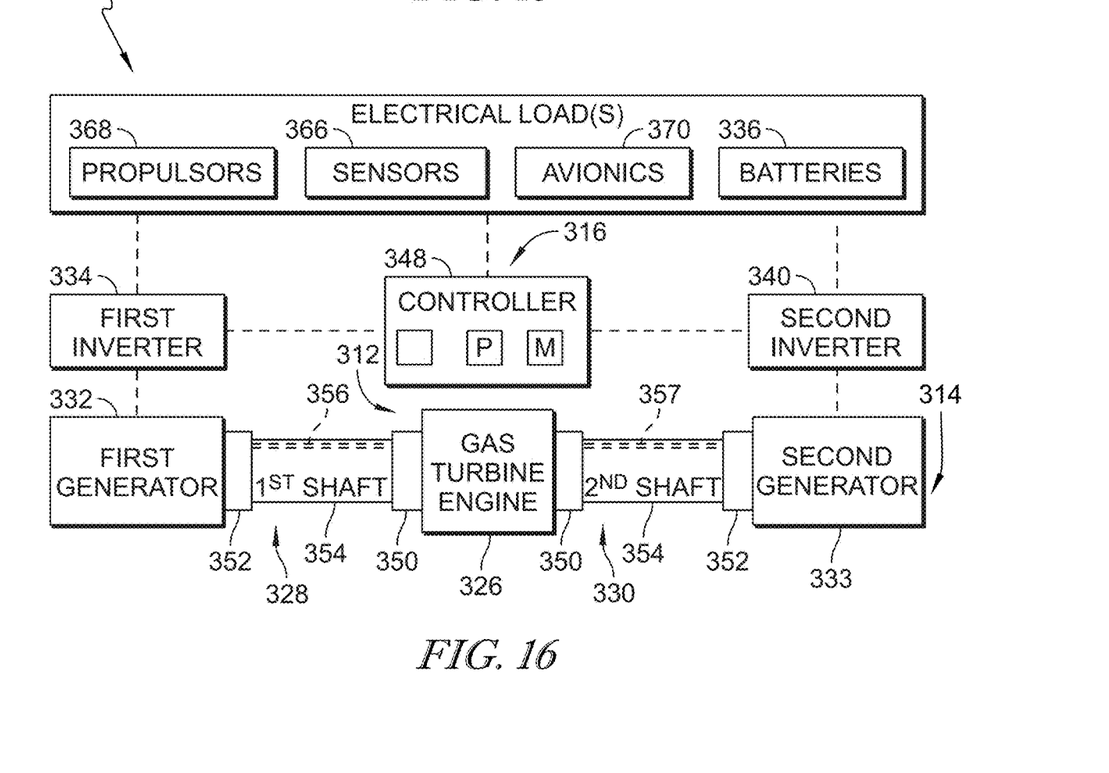
FIG. 16 is a diagrammatic view of the drivetrain of the aircraft in FIG. 15 showing that the drivetrain including shafts coupled to the electric generators to carry rotation from the gas turbine engine to the electric generators, each of the shafts including an imbedded fuse configured to generate heat when an electric current is introduced into the shaft to selectively cause shaft failure.

A second embodiment of an electrified aircraft 210, like a helicopter which incorporates the breakable shaft technology of the present disclosure, is shown in FIGS. 13 and 14 and discussed in further detail below. A third embodiment of an electrified aircraft 310 which incorporates the breakable shaft technology of the present disclosure is shown in FIGS. 15 and 16 and discussed in further detail below.

Referring to FIG. 2, the drivetrain 12 of the electrified aircraft 10 includes a gas turbine engine 20, an output system 22 made up of a propeller 24 and the gearbox 26, and the shaft 28. The shaft 28 couples the gas turbine engine 20 to the permanent magnet machine 32 included in the electric power system 14. The electric power system 14 includes the permanent magnet machine 32, an eclectic control unit includes an inverter 34 and a converter 36, and a battery 38 coupled to the inverter 34.

The permanent magnet machine 32 includes a stator 44 and a rotor 46 as shown in FIG. 2. The rotor 46 is configured to rotate relative to the stator 44 to move a plurality of permanent magnets past a plurality of coils in the stator 44. The shaft 28 is coupled to the rotor 46 of the permanent magnet machine 32 to carry rotation from the gas turbine engine 20 to the permanent magnet machine 32 to drive rotation of the rotor 46.

In the illustrative embodiment, the permanent magnet machine 32 is an electric motor-generator. Permanent magnet machines, like the electric motor-generator shown, continue to create a moving magnetic field as long as the machine is rotating. In the event of a short circuit in the stator windings or other fault, the system can produce undesirable power profiles and/or overheating.

Figure 3:
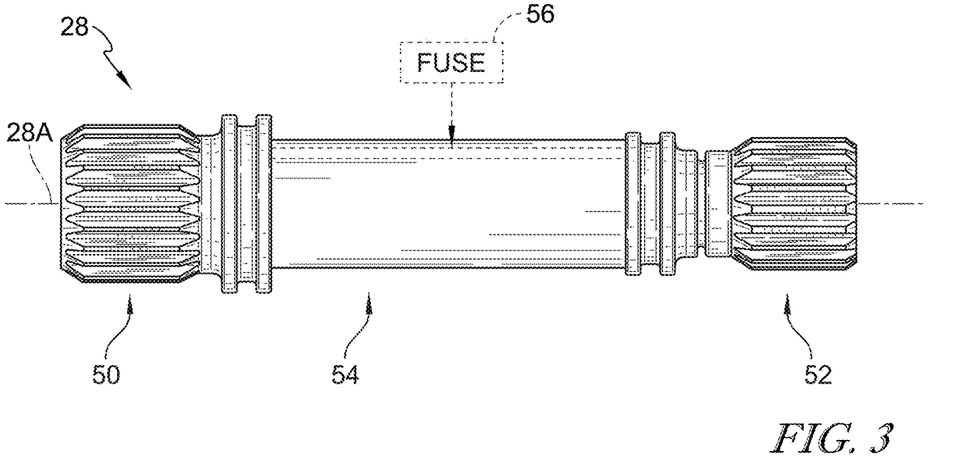
FIG. 3 is a side elevation view of the shaft adapted for use in the drivetrain of FIG. 2 showing the shaft has two shaft end segments spaced apart axially along an axis of the shaft, a shaft body that extends between and interconnects the shaft end segments, and the fuse imbedded in the shaft body that extends axially in a straight line parallel with the axis of the shaft between the two shaft end segments.
Figures 4, 5:
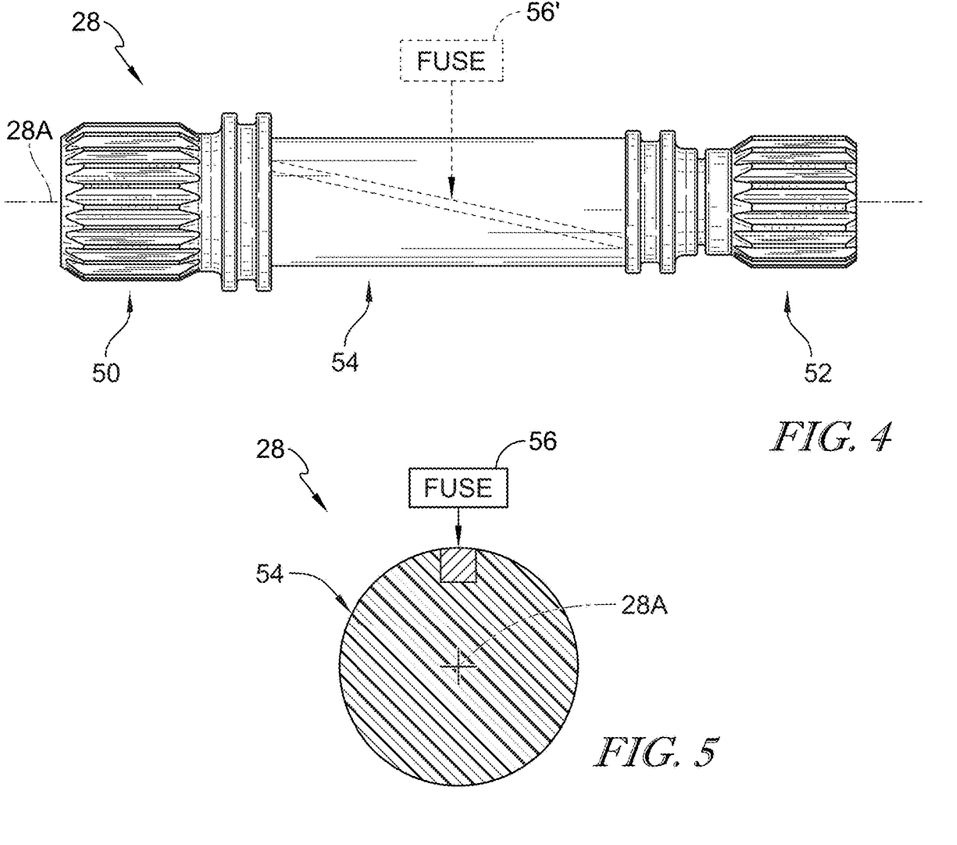
FIG. 4 is a side elevation view of another embodiment of a shaft adapted for use in the drivetrain of FIG. 2 showing the imbedded fuse extends axially and circumferentially partway about the axis between the two shaft end segments.
FIG. 5 is a cross-section view of the shaft of FIG. 3 showing the shaft body comprises a non-conductive material in which the fuse is imbedded as compared to the conductive metallic material of the shaft end segments.
Figure 6:
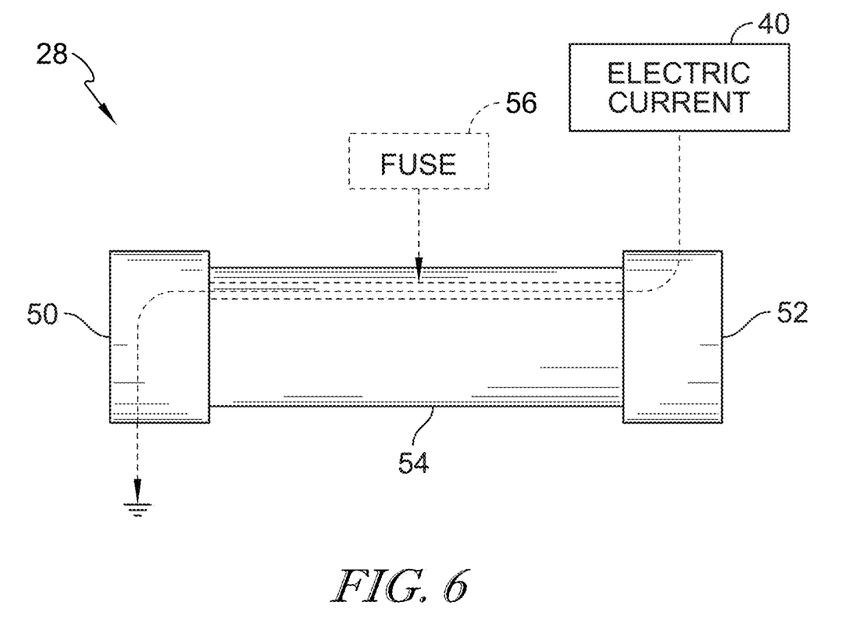
FIG. 6 is diagrammatic view of the shaft of FIG. 3 showing the electric current is introduced into the shaft by unbalancing residual currents in the shaft in response to receiving the signal indicative of the fault in the permanent magnet machine.

The shaft 28 includes a first shaft end segment 50, a second shaft end segment 52 spaced apart axially along an axis 28A of the shaft 28, a shaft body 54, and the fuse 56 imbedded in the shaft body 54 as shown in FIGS. 2-6. The first shaft end segment 50 is coupled with the drivetrain 12 and the second shaft end segment 52 is coupled with the permanent magnet machine 32. The first shaft end segment 50 is illustratively coupled with the gearbox 26. The shaft body 54 extends between and interconnects the shaft end segments 50, 52. The shaft end segments 50, 52 and the fuse 56 comprise conductive metallic material, while the shaft body 54 comprises a non-conductive material as shown in FIG. 5.

The imbedded fuse 56 is configured to generate heat when an electric current 40 is introduced into the shaft 28 to heat the shaft body 54 above a transition temperature of the non-conductive material. At the transition temperature, the stiffness of the non-conductive material is compromised thereby reducing the torque carrying capability of the shaft body 54 such that the shaft body 54 will buckle and fail because of the torque being transmitted through the shaft 28 by the gearbox 26. In this way, the rotor 46 of the permanent magnet machine 32 is mechanically decoupled from the internal combustion engine 20, which stops rotation thereby avoiding generation of undesired power profiles and/or excess heat.

In the illustrative embodiment, the non-conductive material of the shaft body 54 is a thermoset plastic or epoxy that may be reinforced with non-conductive continuous or chopped fibers (for example glass) for structural stiffening. Thermoset materials may have a harsh drop off to stiffness after the glass transition temperature has been reached. The thermoset plastic may be a polymeric material such as polyepoxides.

Figure 11:
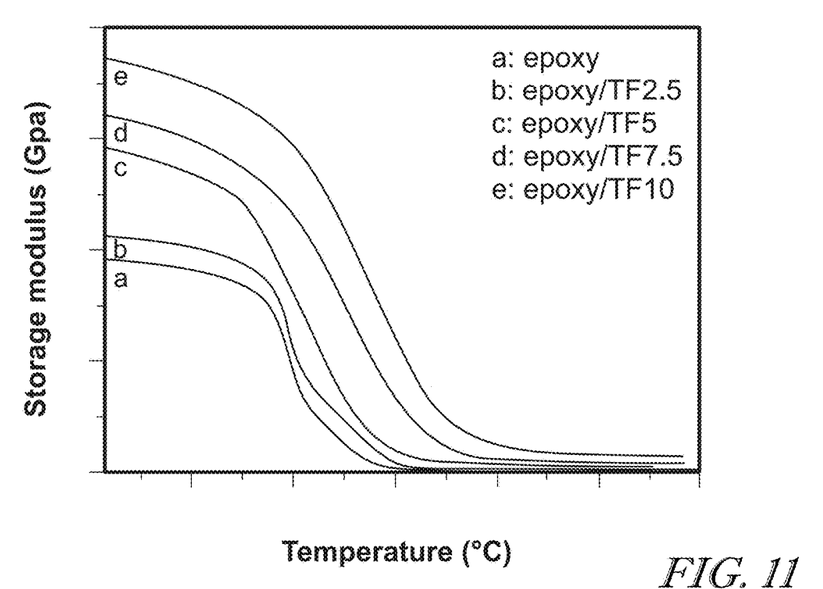
FIG. 11 is a graph showing the modulus behavior of different materials that may make up the shaft body.

An illustrative storage modulus of different thermoset plastic materials compared to the shaft temperature is shown in FIG. 11. The transition temperature of the shaft body 54 is the temperate at which the storage modulus of the shaft body 54 decreases significantly. The transition temperature of the material of the shaft body 54 may be between about 50 degrees Celsius and about 100 degrees Celsius in some embodiments. The transition temperature of the material of the shaft body 54 may be between about 60 degrees Celsius and about 90 degrees Celsius in some embodiments. The transition temperature of the material of the shaft body 54 may be between about 60 degrees Celsius and about 80 degrees Celsius in some embodiments.

Figure 12:
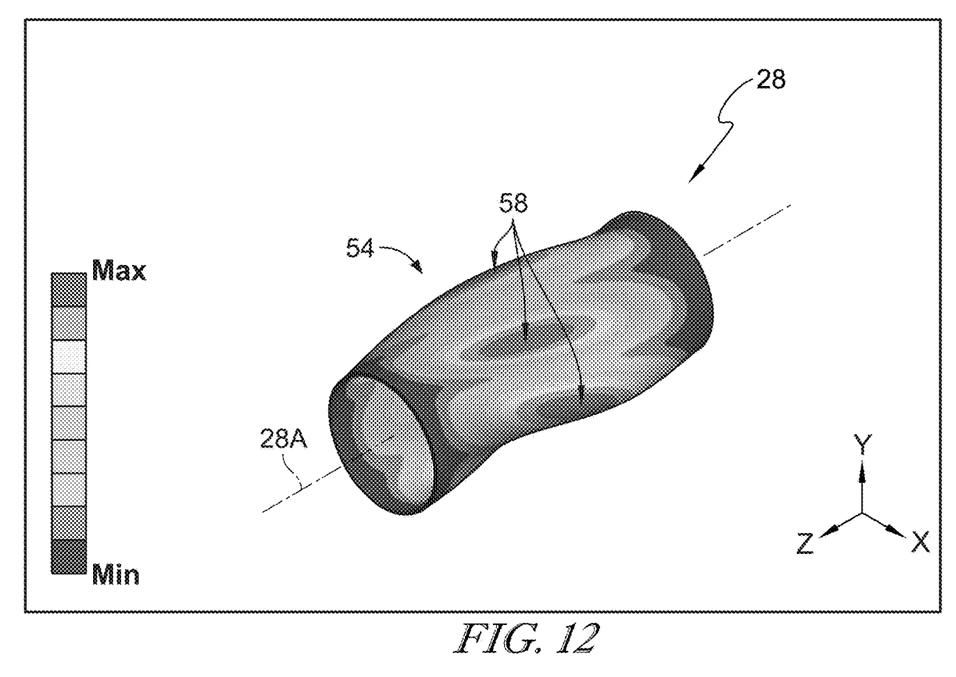
FIG. 12 is a perspective view of the shaft body included in the shaft of FIG. 3 showing a buckling mode shape of the shaft body.

The shaft body 54 has a buckling mode shape 58 as suggested in FIG. 12. The buckling mode shape 58 may vary based on the dimensions, the shape, and/or the material of the shaft body 54. In the illustrative embodiment, the fuse 56 is positioned along buckling mode shape. By placing the fuse 56 along the desired buckling mode shape of the shaft 28, the material change may be triggered where the torque carrying capability of the shaft 28 can be reduced to almost nothing. Given that the engine 20 and/or gearbox 26 will still be applying torque and there will be a resistance load from the electromagnetic effect in the machine 32, then the shaft 28 will be forced to break.

In the illustrative embodiment, the fuse 56 extends axially in a straight line parallel with the axis 28A of the shaft 28 as shown in FIG. 3. In another embodiment of the shaft 28, the shaft 28 includes a fuse 56' extends axially and circumferentially partway about the axis 28A of the shaft 28 between the two shaft end segments 50, 52 as shown in FIG. 4.

The shaft 28 may further include a shaft containment sleeve 60 as shown in FIG. 2. The shaft containment sleeve 60 is arranged around the shaft body 54 to contain any loose material of the shaft body 54 after shaft failure.

The electric current 40 introduced into the shaft 28 is controlled by a control system 16 included in the aircraft 10. The control system 16 includes a controller 48 coupled to the components of the electric power system 14. The controller 48 is configured to direct the electric power system 14 to introduce the electric current 40 into the shaft 28 in response to indictors of a fault in the permanent magnet machine 32.

The controller 48 is configured to direct the electric power system 14 to introduce the electric current 40 into the shaft 28 to cause the fuse 56 to heat the shaft body 54 at or above the transition temperature of the non-conductive material to selectively cause shaft failure. The controller 48 directs the electric power system 14 to introduce the electric current 40 into the shaft 28 in response to indictors of the fault in the permanent magnet machine 32.

The controller 48 is configured to direct the electric power system 14 to induce shaft failure in response to receiving a signal indicative of the fault in the permanent magnet machine 32 or other component. The permanent magnet machine fault may include a turn-to-turn fault, a phase-to-phase fault, or a phase-to-ground fault.

To trigger the shaft failure, the controller 48 may direct one of the inverter 34 and the converter 36 to introduce the electric current 40 into the shaft 28. In one embodiment, the controller 48 directs the converter 36 to introduce the electric current 40 into the shaft 28 by unbalancing residual currents in the shaft 28.

Figure 7:
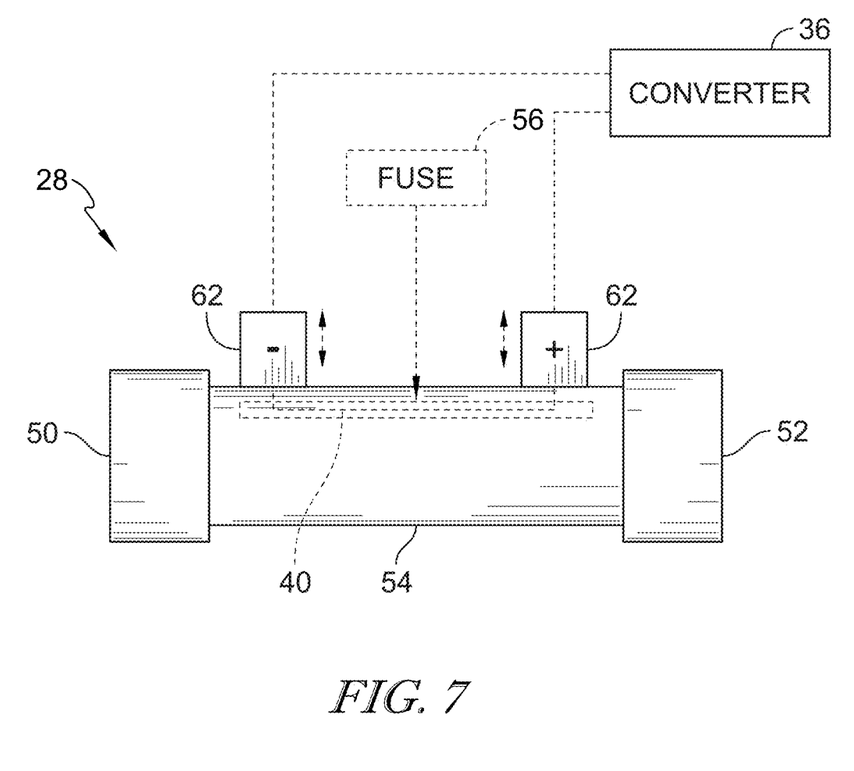
FIG. 7 is a diagrammatic view of another embodiment of a shaft adapted for use in the drivetrain of FIG. 2 showing the electric current is introduced into the shaft body by engaging ground brushes included in the control system with the shaft body in response to receiving the signal indicative of the fault in the permanent magnet machine.

In another embodiment, the control system 16 may further include ground brushes 62 coupled to the converter 36 as shown in FIG. 7. The ground brushes 62 are configured to engage the shaft body 54 so that the electric current 40 is introduced through the ground brushes 62. The controller 48 may direct the converter 36 to introduce the electric current 40 into the shaft 28 through the ground brushes 62.

In some embodiments, the ground brushes 62 are configured to selectively engage the shaft body 54. The ground brushes 62 may be moved radially inward and outward into and out of contact with the shaft 28. In the illustrative embodiment, the ground brushes 62 are always in contact with the shaft body 54 with no electric current applied thereto. Upon the signal indicative of the fault in the permanent magnet machine, the electric current 40 may be applied through the ground brushes 62. At all other times, the ground brushes 62 may be electrically isolated or serving as normal ground brushes.

Figure 8:
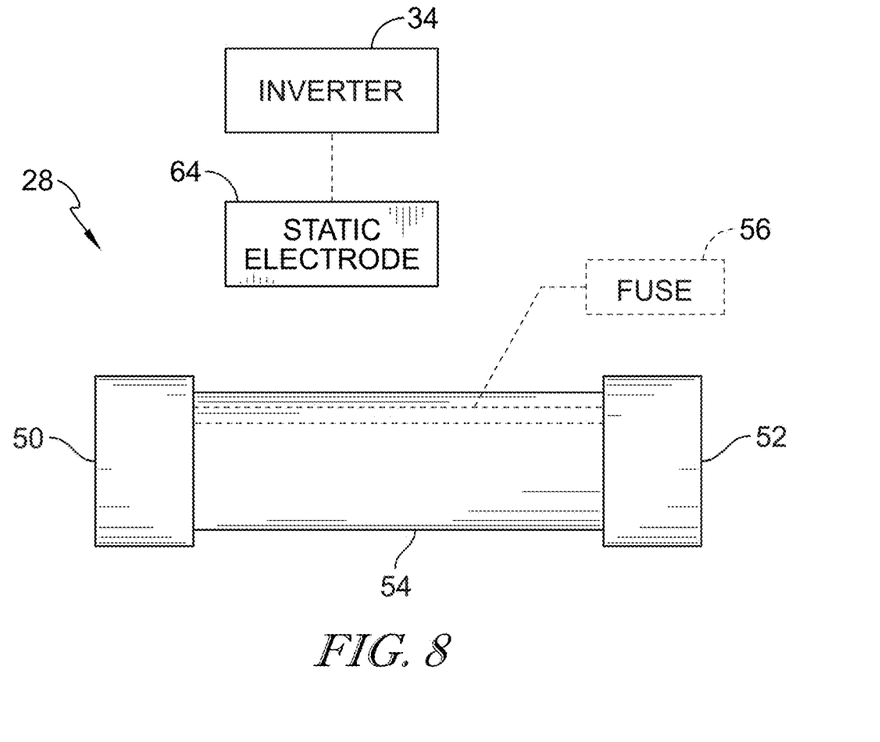
FIG. 8 is a diagrammatic view of another embodiment of a shaft adapted for use in the drivetrain of FIG. 2 showing the electric current is introduced into the shaft body by applying a voltage to a static electrode located adjacent to the shaft body in response to receiving the signal indicative of the fault in the permanent magnet machine.
Figure 9:
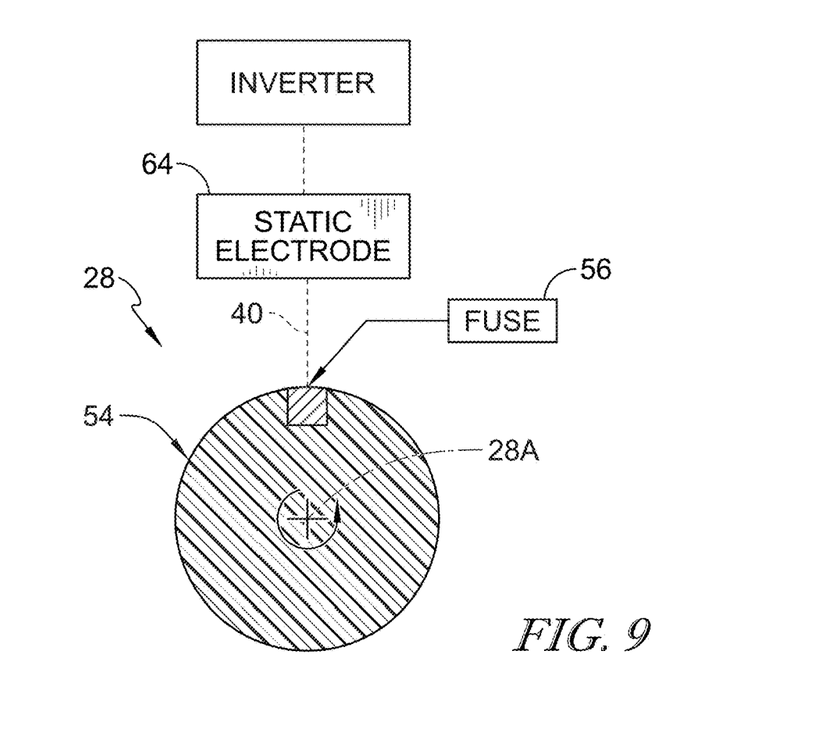
FIG. 9 is a cross-section view of the shaft of FIG. 8 showing the electric current arches between the electrode and the shaft as the fuse approaches the electrode.

In another embodiment, the control system 16 further includes at least one static electrode 64 coupled to the inverter 34 as shown in FIG. 8. The static electrode 64 is located adjacent to the shaft body 54. The controller 48 is configured to direct the inverter 34 to introduce the electric current 40 into the shaft 28 by applying a voltage to the at least one static electrode 64.

The electrode 64 may be energized to 1-10 kV, depending on available energy source and altitude of operation in some embodiments. When the inverter 34 applies a voltage to the electrode 64, arcing occurs between the electrode 64 and the shaft 28 as the fuse 56 approaches the electrode 64 as suggested in FIG. 8. The electric current 40 will flow through the fuse 56. This electrode may be mounted where the fuse 56 passes under the buckling mode. The electrode 64 may be grounded.

In some embodiments, a shaft position sensor (i.e. resolver) may be used to help synchronize these voltages with the orientation of the fuse 56 with respect to the electrode 64. Alternatively, two electrodes 64 at opposing voltages may be staged axially along the shaft 28 such that the fuse 56 enables two short arcs to complete the circuit once per revolution. In this embodiment, the fuse 56 may not extend axially along the way between the two shaft end segments 50, 52.

The controller 48 is configured operate the electric power system 14 in a normal-operation mode before the shaft failure and a motor-disabled mode after the shaft failure in response to the fault in the permanent magnet machine 32. In the normal-operation mode, the permanent magnet machine 32 and the electric power system 14 operate normally to generate electrical energy and use the energy to operate other electrical components included in the electric power system 14 of the aircraft 10 or store the energy on the battery 38 included in the electric power system 14. In the motor-disabled mode, the inverter 34 will stop switching and let the permanent magnet machine 32 coast to a stop. In other embodiments, the inverter 34 may short all three phases if a more rapid stop is needed.

The controller 48 is also configured to receive a signal indicative of shaft failure after the inverter 34 is directed to induce shaft failure. The controller 48 is configured to receive the signal indicative of shaft failure to confirm the shaft 28 has fractured in response to the heat generated by the fuse 56. In response to receiving the signal indicative of shaft failure, the controller 48 is configured to direct the inverter 34 to operate the permanent magnet machine 32 to in the motor-disabled mode.

The controller 48 can include sensors 66 configured to provide feedback to the controller 48. In some embodiments, the sensors 66 include an accelerometer sensor 66 coupled to bearings that support the shaft 28. The accelerometer sensor 66 is configured to measure vibration of the bearings that support the shaft 28. The signal indicative of shaft failure includes a change in vibration of the bearings measured by the accelerometer sensor 66.

In some embodiments, the sensors 66 can include an angle sensor. The angle sensor may be coupled to the machine 32 to measure the position and speed of the shaft 28. In some embodiments, the sensors 66 include a leakage flux sensor. In some embodiments, the controller 48 receives signals indicative of shaft failure from other electrical components in the system.

Figure 10:
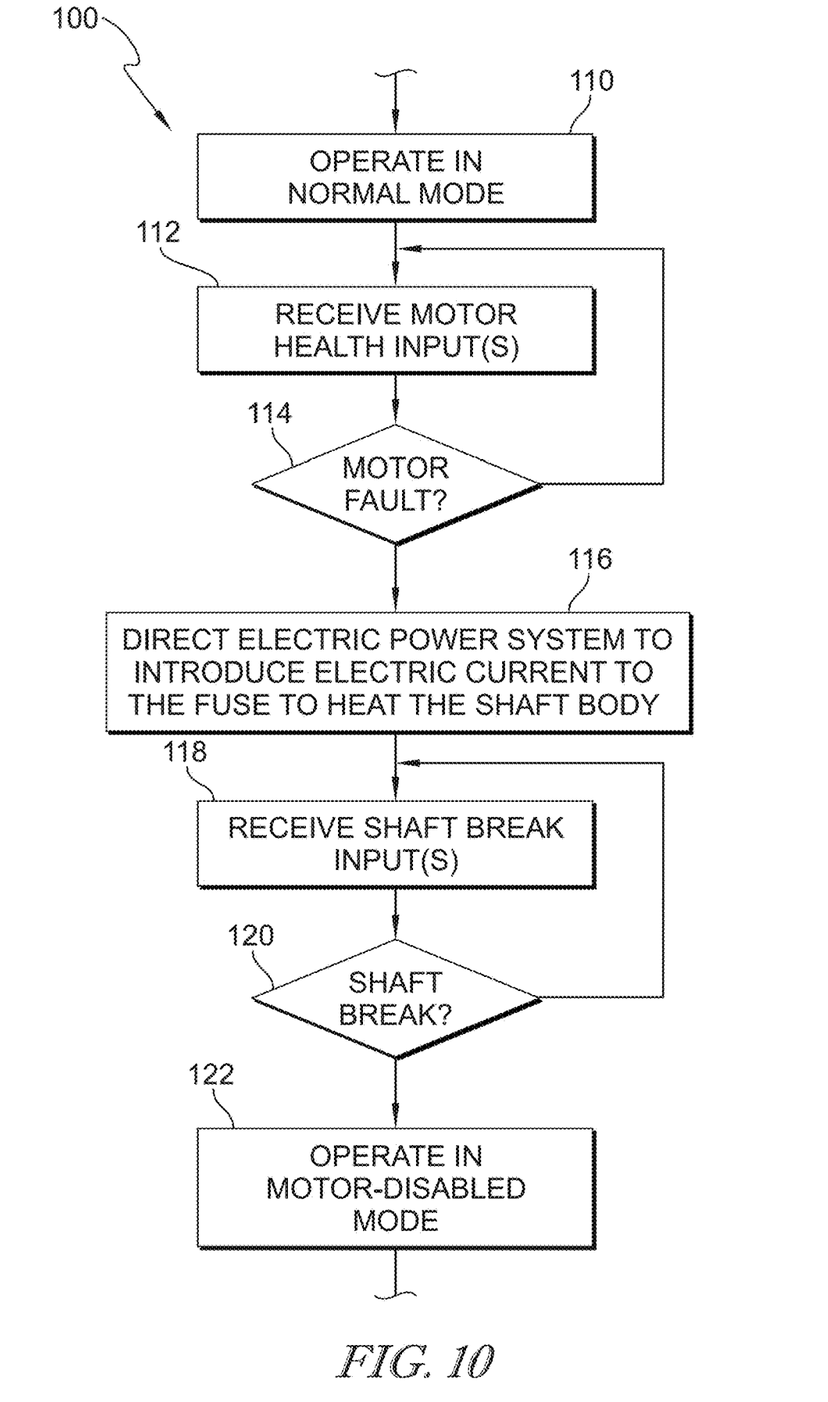
FIG. 10 is a flow chart showing a method of operating the control system to induce shaft failure in response to detection of an electric motor-generator fault.

A method 100 of operating the electric power system 14 may include several steps as shown in FIG. 10. The method 100 begins with operating the permanent magnet machine 32 in the normal operating mode as suggested by box 110.

During the normal operating mode, the controller 48 receives health inputs from the permanent magnet machine 32 or other component as suggested by box 112.

The controller 48 may receive health inputs from the sensors 66 or other electronic components that are indicative of the fault as suggested by box 114. If the controller 48 receives the signal indicative of the fault in the permanent magnet machine 32, the controller 48 directs the electric power system 14 to induce shaft failure as suggested by box 116. To induce shaft failure, the controller 48 directs the electric power system 14 to introduce the electric current 40 into the shaft 28 to cause the fuse 56 to heat the shaft body 54 at or above the transition temperature of the non-conductive material as suggested by box 116.

In some embodiments, the electric power system 14 is configured to introduce the electric current 40 through the shaft 28 only when directed by the controller 48, despite the type of fault that triggered it. The fault may be any one of a turn-to-turn fault in a single phase, a phase-to-phase fault, or a phase-to-ground fault in the permanent magnet machine 32. Any of these may create rapid heating in the permanent magnet machine 32.

After the controller 48 directs the electric power system 14 to induce the electric current 40 through the shaft 28, the sensors 66 provide feedback to the controller 48 as suggested by box 118. The controller 48 uses the feedback from the sensors 66 to confirm the shaft failure as suggested by box 120. If the controller 48 receives the signal indicative of shaft failure from one of the sensors 66, the controller 48 is configured to direct the electric power system 14 to operate in the motor-disabled mode as suggested by box 122. The electric power system 14 is operated in the motor-disabled mode indefinitely until the aircraft 10 can be looked at for repairs.

Another embodiment of an aircraft 210 in accordance with the present disclosure is shown in FIGS. 13 and 14. The aircraft 210 is substantially similar to the aircraft 10 shown in FIGS. 1-9 and described herein. Accordingly, similar reference numbers in the 200 series indicate features that are common between the aircraft 10 and the aircraft 210. The description of the aircraft 10 is incorporated by reference to apply to the aircraft 210, except in instances when it conflicts with the specific description and the drawings of the aircraft 210.

The aircraft 210, such as a helicopter, includes a drivetrain 212, an electric power system 214, and a control system 216 as shown in FIGS. 13 and 14. The drivetrain 212 includes a gas turbine engine 220, an output system 222 made up of a propeller 224 and a gearbox 226 coupled to the propeller 224, and the shaft 228. The shaft 228 couples the gas turbine engine 220 to a permanent magnet machine 232 included in the electric power system 214. The electric power system 214 includes the permanent magnet machine 232, an inverter 234 coupled to the permanent magnet machine 232, a converter 236 coupled to the permanent magnet machine 232, and a battery 238 coupled to the inverter 234. The control system 216 is coupled to the component in the electric power system 214 to control the electric power system 214.

In the illustrative embodiment, the permanent magnet machine 232 is a starter generator-motor as shown in FIG. 14. The starter generator-motor 232 includes a stator and a rotor (not shown). The shaft 228 is coupled to the rotor of the starter generator-motor 232 to carry rotation from the gas turbine engine 220 to the starter generator-motor 232 to drive rotation of the rotor.

In some embodiments, the aircraft 10 may include a starter cart 233 as shown in FIG. 14. The starter cart 233 is coupled to the starter generator-motor 232.

The shaft 228 includes a first shaft end segment 250, a second shaft end segment 252, a shaft body 254, and a fuse 256 imbedded in the shaft body 254 as shown in FIG. 14. The first shaft end segment 250 is coupled with the engine 220 and the second shaft end segment 252 is coupled with the permanent magnet machine 232. The shaft body 254 extends between and interconnects the shaft end segments 250, 252. The shaft end segments 250, 252 and the fuse 256 comprise conductive metallic material, while the shaft body 254 comprises a non-conductive material.

The imbedded fuse 256 is configured to generate heat when an electric current is introduced into the shaft 228 to heat the shaft body 254 above a transition temperature of the non-conductive material. At the transition temperature, the stiffness of the non-conductive material is compromised thereby reducing the torque carrying capability of the shaft body 254 such that the shaft body 254 will buckle and fail. In this way, the rotor 246 of the permanent magnet machine 232 is mechanically decoupled from the engine 220, which stops rotation thereby avoiding generation of undesired power profiles and/or excess heat.

The electric current introduced into the shaft 228 is controlled by a control system 216 included in the aircraft 210. The control system 216 includes a controller 248 coupled to the components of the electric power system 214. The controller 248 is configured to direct the electric power system 214 to introduce the electric current into the shaft 228 in response to indictors of a fault in the permanent magnet machine 232.

Another embodiment of an aircraft 310 in accordance with the present disclosure is shown in FIGS. 15 and 16. The aircraft 310 is substantially similar to the aircraft 10 shown in FIGS. 1-9 and described herein. Accordingly, similar reference numbers in the 300 series indicate features that are common between the aircraft 10 and the aircraft 310. The description of the aircraft 10 is incorporated by reference to apply to the aircraft 310, except in instances when it conflicts with the specific description and the drawings of the aircraft 310.

The aircraft 310 includes a drivetrain 312, an electric power system 314, and a control system 316 as shown in FIGS. 15 and 16. The drivetrain 312 includes a gas turbine engine 320 and shafts 328, 330. Each of the shafts 328, 330 couples the gas turbine engine 320 to a generator 332, 333 included in the electric power system 314. The electric power system 314 includes first and second generators 332, 333, first and second inverters 334, 340 coupled to the respective generator 332, 333, and electrical loads 342. The electrical loads 342 include batteries 336, sensors 366, propulsors 368, and avionics 370.

The first shaft 328 couples the gas turbine engine 320 to the first generator 332 and the second shaft 330 couples the gas turbine engine 320 to the second generator 333. The gas turbine engine 320 drives the generators 332, 333 to generate electrical power. The electrical power generated is used to power the electrical loads 318.

Each of the shafts 328, 330 is formed to include a first shaft end segment 350 coupled to the gas turbine engine 320, a second shaft end segment 352 coupled to the corresponding generator 332, 333, a shaft body 354 that extends between the first and second shaft end segments 350, 352, and a fuse 356, 357 imbedded in the shaft body 354 as shown in FIG. 16. The shaft end segments 350, 352 and the fuse 356 comprise conductive metallic material, while the shaft body 354 comprises a non-conductive material as shown in FIG. 16.

Each imbedded fuse 356, 357 is configured to generate heat when an electric current is introduced into the corresponding shaft 328, 330 to heat the shaft body 354 above a transition temperature of the non-conductive material. At the transition temperature, the stiffness of the non-conductive material is compromised thereby reducing the torque carrying capability of the shaft body 354 such that the shaft body 354 will buckle and fail. In this way, the corresponding permanent magnet machine 332, 333 is mechanically decoupled from the engine 320, which stops rotation thereby avoiding generation of undesired power profiles and/or excess heat.

Permanent magnets included in permanent magnet generators typically cannot be switched off in under normal circumstances. In some instances, permanent magnets may be de-magnetized in high temperature environments or adverse magnetic field environments. However, under normal circumstances, the permanent magnets cannot be switched off, and will continue to create a moving magnetic field so long as the machine is rotating. This rotation continues even if there is a short circuit in the stator windings, which can threaten the system with overheating.

The use of electric machines, such as generators, may introduce the potential for specific failure modes. In an effort to prevent these failure modes, the electric machine may be shut off in response. While some machine architectures may easily accommodate this, permanent magnet machines may use an additional mechanism to disconnect the rotor so that the rotating electromagnetic field is stopped and power is no longer being generated and the fault is no longer being fed.

In conventional systems, an additional electromagnetic clutch may be included to disconnect the rotor. These systems are complicated and significantly increase the weight, taking as much as 20% of the weight allocation. Therefore, a lighter solution may be desired.

Therefore, the present disclosure teaches an interconnecting quill shaft 28, 228, 328, 330 between the driving engine/gearbox and the electric machine. The main segment, or shaft body 54, 254, 354 of the shaft 28, 228, 328, 330 comprises a non-conductive thermoset plastic material and may be reinforced with non-conductive continuous or chopped fibers (for example glass) for structural stiffening. The shaft ends 50, 52, 250, 252, 350, 352 comprise a conductive metallic material. A metallic strip, or fuse 56, 256, 356 may be embedded in the composite center section of the shaft 28, 228, 328, 330 and be joined to the conductive end segments 50, 52, 250, 252, 350, 352.

When a suitable electric current is introduced into the shaft 28, 228, 328, 330, the conductive strip heats up significantly to compromise the material stiffness. Thermosets used in composites typically have a very harsh drop off to stiffness after the glass transition temperature has been reached. By placing the conductive strip 56, 256, 356 along the desired buckling mode of the shaft 28, 228, 328, 330, this material change may be triggered electrically where the torque carrying capability of the shaft 28, 228, 328, 330 may be reduced to almost nothing. Given that the engine/gearbox will still be applying torque and there will be a resistance load from the electromagnetic effect in the machine, then the shaft 28, 228, 328, 330 will be forced to break thus disconnecting the machine 20, 220, 320.

In some embodiments, debris containment may be implemented. For example, the shaft containment sleeve 60 may be arranged around the shaft body 54 to contain any loose material of the shaft body 54 after shaft failure.

Additionally, composite shafts may be generally lighter than fully metallic examples. The metallic shafts may contribute to around 5-10% the total mass contribution of an Electromagnetic clutch to accomplish the same task.

Methods of introducing current into the conductive heating element 56, 256, 356 may be managed internal to the machine 20, 220, 320 through residual shaft currents or through external sources. If done externally, a current may be introduced by capacitors, batteries, or even the power generated from the faulting machine 20, 220, 320. In this case, the shaft 28, 228, 328, 330 may be electrically isolated from the rotating hardware and the path to apply electrical current may be isolated from other static structures.

In another embodiment, a grounded shaft 28 may have current injected directly into the conductive strip 56 placed on the failure point of the shaft 28 by means of a static electrode 64 in close proximity to the shaft 28. The static electrode 64 may be energized to 1-10 kV, depending on available energy source and altitude of operation. The use of a static electrode 64 may depend on the shaft grounding/isolation arrangement and the other grounding paths available for the current to follow.

If the rotor 46 is isolated, a similar effect may be produced with a grounded electrode 64 if shaft voltages may be injected by the inverter 34. Use of any shaft position sensor 66 (i.e. resolver) may help synchronize these voltages with the orientation of the strip 56 with respect to the electrodes 64. Alternatively, two electrodes 64 at opposing voltages may be staged along the shaft 28 such that the conductive strip 56 enables two short arcs to complete the circuit once per revolution. This enables the shaft 28 to be truly insulating in a healthy motor—the conductive strip 56 no longer has to reach all the way to the ends 50, 52.

For example, assuming a shaft body 54 made of pure epoxy, the modulus behavior may correlate to that shown in FIG. 11. The shaft 28 with this material may be configured to operate in temperatures around 40 degrees Celsius, where the material properties are stable. However, the embedded metallic strip 56 and subsequent localized heating may be able to increase local temperatures to 80 degrees Celsius or greater.

FIG. 12 shows one of the buckling modes and the torques required to excite the buckling modes at various temperatures. At RT, this fully epoxy shaft 28 may buckle at 38 Nm at RT, but only 2 Nm after the glass transition temperature (a 94% reduction in torque carrying capability, in this example).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
an engine,
an electric power system including a permanent magnet machine and an electric control unit coupled to the permanent magnet machine, the permanent magnet machine including a stator having a plurality of coils and a rotor having a plurality of permanent magnets and configured to rotate relative to the stator to move the plurality of permanent magnets relative to the plurality of coils of the stator, a shaft coupled to the rotor of the permanent magnet machine to transfer rotation from the engine to the permanent magnet machine to drive rotation of the rotor, the shaft including a first shaft end segment coupled with the engine and comprising electrically conductive metallic material, a second shaft end segment coupled with the permanent magnet machine and comprising the electrically conductive metallic material, a shaft body comprising electrically non-conductive material that extends between and interconnects the first shaft end segment and the second shaft end segment, and a fuse imbedded in the shaft body and configured to generate heat when an electric current is passed through the fuse, and a control system including a controller coupled to the electric control unit of the electric power system and configured to direct the electric control unit to introduce the electric current through the fuse to cause the fuse to heat the shaft body above a transition temperature of the electrically non-conductive material of the shaft body to selectively cause failure of the shaft in response to the controller receiving a signal indicative of a fault in the permanent magnet machine so that the rotor of the permanent magnet machine is mechanically decoupled from the engine thereby avoiding generation of undesired electrical energy and/or heat.

2. The aircraft of claim 1, wherein the non-conductive material is a thermoset plastic.

3. The aircraft of claim 2, wherein the shaft body of the shaft has a buckling mode shape and the fuse is positioned along the buckling mode shape of the shaft.

4. The aircraft of claim 3, wherein the fuse extends axially in a straight line parallel with an axis of the shaft body.

5. The aircraft of claim 2, wherein the shaft further includes a shaft containment sleeve arranged around the shaft.

6. The aircraft of claim 1, further comprising a gearbox coupled to the engine and the first shaft end segment of the shaft.

7. The aircraft of claim 6, wherein the fault in the permanent magnet machine includes at least one of a turn-to-turn fault, a phase-to-phase fault, and a phase-to-ground fault.

8. The aircraft of claim 7, wherein the electric control unit of the electric power system includes a converter and the controller is configured to direct the converter to introduce the electric current into the shaft by unbalancing residual currents in the shaft in response to receiving the signal indicative of the fault in the permanent magnet machine.

9. The aircraft of claim 7, wherein the electric control unit of the electric power system includes a converter, wherein the control system further includes ground brushes coupled to the converter and configured to engage the shaft body of the shaft, and wherein the controller is configured to direct the converter to introduce the electric current into the shaft through the ground brushes in response to receiving the signal indicative of the fault in the permanent magnet machine.

10. The aircraft of claim 7, wherein the electric control unit of the electric power system includes an inverter, wherein the control system further includes at least one static electrode coupled to the inverter and located adjacent to the shaft body, and wherein the controller is configured to direct the inverter to introduce the electric current into the shaft by applying a voltage to the at least one static electrode in response to receiving the signal indicative of the fault in the permanent magnet machine.

11. The aircraft of claim 6, wherein the controller is configured to receive a signal indicative of failure of the shaft after the electric control unit of the electric power system introduces the electric current into the shaft to confirm the shaft has failed in response to the heat generated by the fuse.

12. An aircraft comprising
an engine,
an electric power system including a permanent magnet machine that includes a stator having a plurality of coils and a rotor having a plurality of permanent magnets and configured to rotate relative to the stator to move the plurality of permanent magnets relative to the plurality of coils in the stator,
a shaft coupled to the rotor of the permanent magnet machine to transfer rotation from the engine to the permanent magnet machine to drive rotation of the rotor, the shaft including a shaft body comprising an electrically non-conductive material and a fuse coupled with the shaft body and in selective electric communication with the electric power system, the fuse configured to generate heat when an electric current is introduced into the fuse, and
a control system including a controller coupled to the electric power system and configured to direct selectively the electric power system to introduce the electric current into the fuse to cause the fuse to heat the shaft body above a transition temperature of the electrically non-conductive material of the shaft body to cause the shaft to fail.

13. The aircraft of claim 12, wherein the non-conductive material is a thermoset plastic.

14. The aircraft of claim 12, wherein the shaft body of the shaft has a buckling mode shape and the fuse is positioned along the buckling mode shape of the shaft.

15. The aircraft of claim 12, wherein the shaft further includes a shaft containment sleeve arranged around the shaft.

16. The aircraft of claim 12, further comprising a gearbox coupled to the engine and the first shaft end segment of the shaft.

17. The aircraft of claim 12, wherein a fault in the permanent magnet machine includes at least one of a turn-to-turn fault, a phase-to-phase fault, and a phase-to-ground fault.

18. The aircraft of claim 17, wherein the controller is configured to direct the electric power system to introduce the electric current into the shaft by unbalancing residual currents in the shaft in response to receiving a signal indicative of the fault in the permanent magnet machine.

19. The aircraft of claim 17, wherein the control system further includes ground brushes coupled to the electric power system and configured to engage the shaft body of the shaft, and wherein the controller is configured to direct a converter to introduce the electric current into the shaft through the ground brushes in response to receiving a signal indicative of the fault in the permanent magnet machine.

20. The aircraft of claim 17, wherein the control system further includes at least one static electrode coupled to the electric power system and located adjacent to the shaft body, and wherein the controller is configured to direct the electric power system to introduce the electric current into the shaft by applying a voltage to the at least one static electrode in response to receiving a signal indicative of the fault in the permanent magnet machine.

* * * * *